United States Patent [19]

Cutter

[11] Patent Number: 4,756,116
[45] Date of Patent: Jul. 12, 1988

[54] SNAIL BARRIER

[76] Inventor: John W. Cutter, 10 Sleepy Hollow La., Orinda, Calif. 94563

[21] Appl. No.: 115,893

[22] Filed: Nov. 2, 1987

[51] Int. Cl.$^4$ .............................................. A01M 1/22
[52] U.S. Cl. ........................................ 43/108; 43/112; 43/121
[58] Field of Search .................. 43/107, 108, 112, 121

[56] References Cited

U.S. PATENT DOCUMENTS

| | | | |
|---|---|---|---|
| 3,504,892 | 4/1970 | Crist | 43/112 |
| 3,826,035 | 7/1974 | Paniagua | 43/98 |
| 4,074,456 | 2/1978 | Tidwell | 43/112 |
| 4,144,668 | 3/1979 | Darncharnjitt | 43/112 |
| 4,241,532 | 12/1980 | Fancy | 43/112 |
| 4,274,123 | 6/1981 | Rogers | 43/112 |
| 4,471,561 | 9/1984 | Lapierre | 43/108 |
| 4,471,562 | 9/1984 | Brucker | 43/108 |

Primary Examiner—M. Jordan
Attorney, Agent, or Firm—Harris Zimmerman; Howard Cohen

[57] ABSTRACT

A pair of strips formed of dissimilar materials, such as copper and zinc for example, are disposed along a surface to define a zone which inhibits the entry of snails, slugs or the like. The dissimilar materials are ones which exhibit different electrode potentials or voltages when in contact with an electrolyte. It is believed that the exudate or slime present on the skin of a snail or the like has electrolytic characteristics and electrochemical reactions occur when the body of the snail or the like spans the dissimilar strips which reactions are sensed by the snail and discourage further progress. The barrier may be preformed as a flexible, adhesive coated ribbon or tape with the two electrically conductive strips extending along opposite edge regions of one surface of the tape.

12 Claims, 1 Drawing Sheet

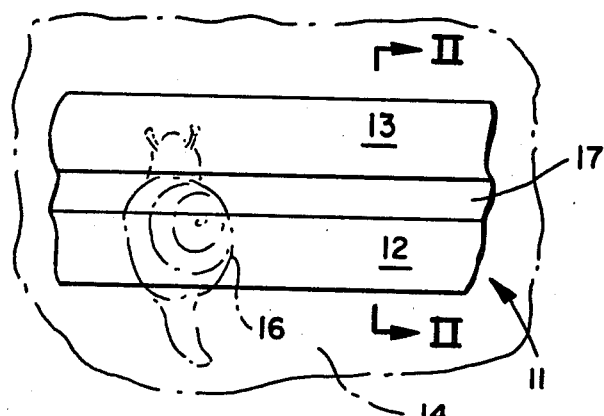
FIG_1
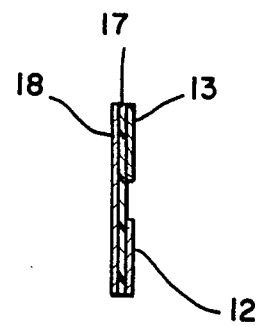
FIG_2
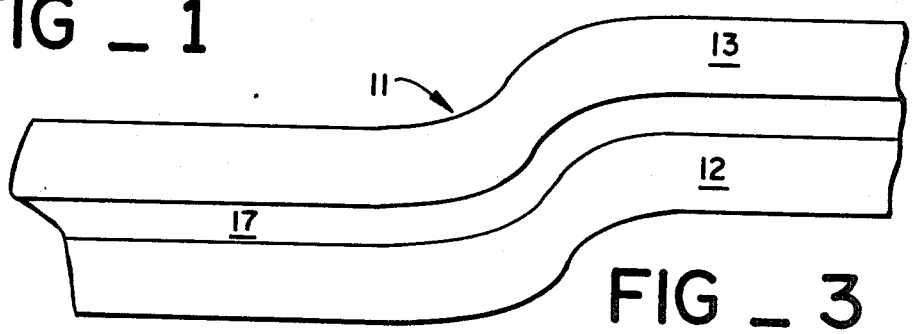
FIG_3
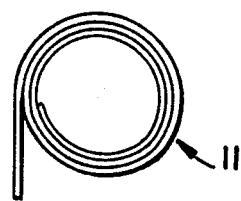
FIG_4
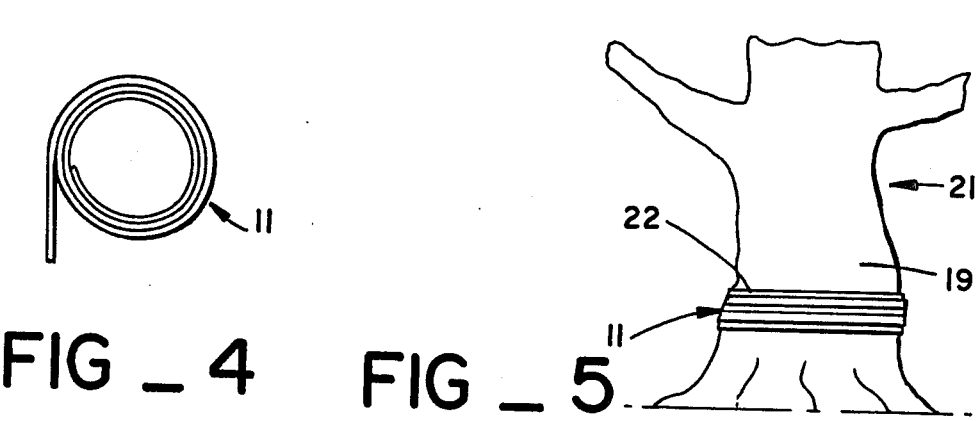
FIG_5
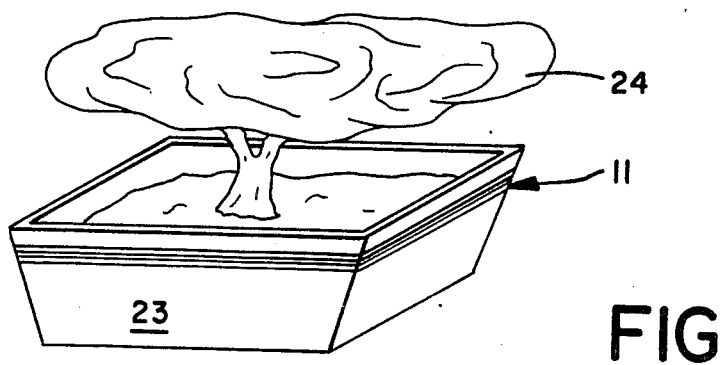
FIG_6

SNAIL BARRIER

TECHNICAL FIELD

This invention relates to pest control and more particularly to a barrier device for repelling snails, slugs or the like.

BACKGROUND OF THE INVENTION

Terrestrial gastropods, such as snails and slugs, consume foliage and are a major cause of plant damage both in agriculture and in home gardens. Conventional techniques for controlling snails or the like include the use of toxic snail baits and, as an alternative, hand picking of the pests from foliage.

Snail baits remain effective for only a limited period of time particularly if rains occur. Thus frequently repeated applications of such baits are usually needed in order to protect plants in a given area. Use of toxic snail baits may be inadvisable in areas where small children or pet animals are present and many persons have a general aversion to the deliberate spreading of toxic substances into the environment.

Hand picking of snails or slugs from foliage must be accompanied by destruction of the pests. This is much more effective when it is done at night as such pests are nocturnal foragers and are generally concealed on the undersides of foliage during daylight. The process is in general tedious and time consuming and is distinctly unpleasant to many persons.

Various forms of electrical barrier have hertofore been developed for the purpose of repelling insects and animals from an area that is to be protected or, in the case of insects in particular, for the purpose of extermination. These prior systems are not particularly adaptable to the control of snails and slugs. Such systems require an external source of electrical power such as a battery or a connection to utility power lines and continuously consume electrical energy. Such systems also tend to be complex, costly and require a significant amount of maintenance effort.

It would be advantageous if a simple, economical and easily installed barrier were available which could be placed around the perimeter of areas to be protected from snails, slugs or the like and which did not involve the distribution or poison baits, hand picking or require connection to an electrical power supply.

The present invention is directed to overcoming one or more of the problems discussed above.

SUMMARY OF THE INVENTION

In one aspect, the present invention provides a barrier for inhibiting snails, slugs or the like from crossing a predetermined zone on a surface. The barrier includes first and second electrically conductive strips which extend along the zone on the surface and which are positioned to be spanned by the body of a snail, slug or the like which attempts to cross the zone. The first and second strips are of dissimilar materials which have different electrochemical electrode potentials.

In another aspect, the invention provides a length of barrier for forming a zone on a surface which repels snails, slugs or other organisms which havea moist skin with electrolytic qualities, which comprises a backing ribbon, a layer of a first metallic material extending one edge region of the backing ribbon at one surface of the ribbon and a layer of a second metallic material extending along the other edge region of the same surface. The first and second metallic materials are ones which exhibit different voltages when in contact with an electrolyte.

Dissimilar strips of materials of the kind used to form the anode and cathode of an electrical battery have been found to be a very effective barrier to snails or the like if the strips are sufficiently close together to be spanned by the body of a snail which attempts to cross the barrier. It is believed that the exudate or slime which is present on the skin of a snail or the like has electrolytic qualities which initiate electrochemical reactions when in contact with two materials which have different electrode potentials such as copper and zinc for example. The electrical effects are apparently traumatic to the snail which responds by retreating from the barrier. Paired strips of such materials can be very easily and economically installed around the perimeter of areas in a garden or around the trunks of trees or shrubs or around the walls of planter boxes which are to be protected.

BRIEF DESCRIPTION OF THE DRAWINGS

FIG. 1 depicts a portion of a snail barrier in accordance with an embodiment of the invention.

FIG. 2 is a cross section view taken along line II—II of FIG. 1.

FIG. 3 depicts an embodiment of the invention which can be manufactured in preassembled flexible strip form.

FIG. 4 depicts the embodiment of FIG. 3 in a rolled configuration which is convenient for distribution and storage prior to actual use.

FIG. 5 illustrates a typical use of the barrier to protect a tree or shrub.

FIG. 6 is a perspective view of a typical disposition of the barrier for protecting plants within a planter box.

DETAILED DESCRIPTION OF THE PREFERRED EMBODIMENTS

Referring initially to FIGS. 1 and 2 of the drawings in conjunction, a snail barrier 11 in accordance with this embodiment of the invention has first and second electrically conductive strips 12 and 13 which extend along a surface 14 which snails 16 or the like must cross to enter a region that is to be protected. The surface 14 may variously be the ground itself, garden pavement, planter boxes or the trunk of a plant as will hereinafter be discussed in more detail.

First and second strips 12 and 13 are form of different, usually metallic, materials which exhibit diffrent electrochemical electrode potntials when the two strips ar jointly in contact with an electrolyte or ionic liquid. Thus dissimilar metals of the types used to form the cathode and anode of electrical batteries or voltaic cells are suitable for the purpose. While other materials of this type may also be used, it is advantageous if one of the strips 12 is formed of copper and the other strip 13 is formed of zinc as these two metals are both relatively resistant to corrosion in an outdoor environment.

The deterrent effect may occur if the two strips 12 and 13 are adjoining but it is preferable that they be slightly spaced apart to avoid deterioration of the adjoining edges from electrolysis effects that may be caused by moisture. The spacing of the strips 12 and 13 should not exceed the body length of a mature snail 16 and preferably should be substantially smaller. Strips 12 and 13 may, for example, each have a width of about ¼ inch and be separated by the same distance although these dimensions should not be considered to be limiting of the invention as other widths and/or spacings are also suitable.

I have ascertained by experiment that snails and slugs attempting to cross the barrier 11 quickly retreat after reaching a point at which their bodies are in contact with both strips 12 and 13. This is apparently a result of electrochemical effects to which the snail or the like is sensitive. It appears that the exudate of slime at the snails skin is an electrolyte and electrochemical effects occur that are similar to those which take place when the elctrodes of a voltaic cell or battery come into contact with the electrolytic fluid. A battery requires a conductive connection between the electrodes additional to that of the electrolyte in order to produce a sustained current. That is not necessarily required for the present purpose. Possibly the snails body functions both as the electrolyte and return current conductor or possibly the snail is sensitive to the initial ionic displacemnts which occur in an electrolyte when it first contacts two dissimilar metals. In any case the above described barrier 11 is demonstratively effective.

The two strips 12 and 13 may be separate and be individually attached to the surface 14 where the barrier 11 is to be formed. Preferably, for greater convenience, the strips 12 and 13 are attached to opposite edge regions of a backing tape or ribbon 17 by adhesive or other means. The opposite surface of the ribbon 17 may also be coated with a layer 18 of adhesive to facilitate attachment to the surface 14 where the barrier 1 is desired. It is preferable that the backing ribbon 17 be non-conductive, to avoid electrolysis corrosion that can occur between dissimilar metals in contact. Thus double sided adhsive tpee makes a convenient base for assembling the snail barrier 11.

If the metal strips 12 and 13 are sufficiently thin, the snail barrier 11 is flexible as depicted in FIG. 3. This facilitates installation, particularly if the barrier is to be installed on a curved or irregular surface. This also enables the barrier 11 to be packaged, transported and merchandized in a convenient rolled form as depicted in FIG. 4.

The conductive strips 12 and 13 need not necessarily be cut from sheet metal but can also be strips of foil or may be applied to the backing ribbon 17 or directly to the surface to be protected as coatings of conductive metallic paint.

The snail barrier 11 may be disposed at any of a variety of surfaces in any of a variety of configurations. Referring to FIG. 5, for example, the barrier 11 may be may be encircled around the trunk 19 of a shrub or tree 21. In that usage it may be helpful to dispose a layer 22 of galvanized sheet metal around the trunk 19 behind the barrier 11 to provide a smooth surface against which the barrier may be adhered.

As depicted in FIG. 6, the barrier 11 may also be used to encircle planter boxes 23 or the like which contain plants 24 that might be subject to damage from snails or the like.

While the invention has been described with respect to certain specific preferred embodiments for purposes of example, many modifications and variations are possible and it is not intended to limit the invention except as defined in the following claims.

I claim:
1. A barrier for inhibiting snails, slugs or the like from crossing a predetermined zone on a surface, comprising: first and second electrically conductive strips extending along said zone of said surface and being positioned to be spanned by the body of a snail, slug or the like which attempts to cross said zone, said first and second strips being formed of dissimilar materials which have different electrochemical electrode potentials.

2. The barrier of claim 1 wherein said strips are spaced apart a distance which is smaller than the body length of a mature snail, slug or the like.

3. The barrier of claim 1 further including a backing ribbon of material extending along said zone of said surface between said first and second electrically conductive strips and said surface, said backing ribbon being attached to said surface and said first and second electrically conductive strips being attached to said backing ribbon.

4. The barrier of claim 3 wherein said backing ribbon is attached to said surface by a coating of adhesive on one surface of said ribbon.

5. The barrier of claim 3 wherein said first and second electrically conductive strips are attached to said ribbon by a layer of adhesive therebetween.

6. The barrier of claim 3 wherein said backing ribbon is attached to said surface by a first coating of adhesive on one surface of said ribbon and wherein said first and second electrically conductive strips are attached to said ribbon by a second coating of adhesive on the opposite surface of said ribbon.

7. The barrier of claim 3 wherein said backing ribbon is formed of electrically non-conductive material.

8. The barrier of claim 1 wherein said first and second electrically conductive strips are strips of dissimilar metals.

9. The barrier of claim 8 wherein one of said strips is formed at least in part of copper and the other of said strips is formed at least in part of zinc.

10. The barrier of claim 1 wherein said first and second electrically conductive strips have a flat configuration, are parallel to said surface and wherein each has a thickness substantially smaller than the width of said strips.

11. A length of barrier for forming a zone on a surface which repels snails, slugs or other organisms which have a moist skin with electrolytic qualities, comprising: a backing ribbon, a layer of a first metallic material extending along one edge region of said backing ribbon at one surface thereof, a layer of a second metallic material extending along the other edge region of said one surface of said backing ribbon, said first and second metallic materials being ones which exhibit different voltages when in contact with an electrolyte.

12. The length of barrier of claim 11 wherein said backing ribbon and each of said first and second layers of mettallic material have a flat configuration and said backing ribbon and said first and second layers are adhered together.

* * * * *